United States Patent
Yoshida (10) Patent No.: US 11,435,917 B2
(45) Date of Patent: Sep. 6, 2022

(54) STORAGE CONTROL DEVICE FOR DETERMINING STORAGE DEVICE TO READ COLLECTIVELY BLOCKS OF OBJECT, STORAGE SYSTEM FOR DETERMINING STORAGE DEVICE TO READ COLLECTIVELY BLOCKS OF OBJECT, AND COMPUTER-READABLE RECORDING MEDIUM STORING PROGRAM FOR DETERMINING STORAGE DEVICE TO READ COLLECTIVELY BLOCKS OF OBJECT

(71) Applicant: FUJITSU LIMITED, Kawasaki (JP)

(72) Inventor: Taketoshi Yoshida, Kunitachi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/083,354

(22) Filed: Oct. 29, 2020

(65) Prior Publication Data
US 2021/0181944 A1    Jun. 17, 2021

(30) Foreign Application Priority Data

Dec. 17, 2019   (JP) .............................. JP2019-227435

(51) Int. Cl.
*G06F 3/06* (2006.01)

(52) U.S. Cl.
CPC .............. *G06F 3/064* (2013.01); *G06F 3/065* (2013.01); *G06F 3/067* (2013.01); *G06F 3/0619* (2013.01); *G06F 3/0659* (2013.01); *G06F 3/0683* (2013.01)

(58) Field of Classification Search
CPC ........ G06F 3/064; G06F 3/0619; G06F 3/065; G06F 3/0659; G06F 3/067; G06F 3/0683
See application file for complete search history.

(56) References Cited

U.S. PATENT DOCUMENTS

2005/0102484 A1   5/2005  Liu et al.
2006/0190763 A1*  8/2006  Ashmore ............ G06F 11/1076
                                                    714/6.2

(Continued)

FOREIGN PATENT DOCUMENTS

JP      2003-223285 A    8/2003
JP      2005-148854 A    6/2005

OTHER PUBLICATIONS

Lingfang Zeng, Dan Feng, Fang Wang, Ke Zhou and Peng Xia, "Hybrid RAID-tape-library storage system for backup," Second International Conference on Embedded Software and Systems (ICESS'05), 2005, pp. 6 pp.-, doi: 10.1109/ICESS.2005.60. (Year: 2005).*

*Primary Examiner* — Eric Cardwell
(74) *Attorney, Agent, or Firm* — Fujitsu Patent Center (57) ABSTRACT

A storage control device, includes a processor configured to: dispose original blocks to which data on an object basis is divided and assigned and copy blocks which are copies of the original blocks respectively alternately in storage devices of a distributed storage system in a distributed manner; determine, upon reception of a read request for an object, as a first storage control device out of the storage control devices a read task which collectively reads the original blocks and the copy blocks which belong to the object from one of the storage devices; notify the storage control devices of the read task; upon reception of the read request as the first storage control device, collectively read the original blocks and the copy blocks; and transfer the data of the blocks which have been read to a second storage control device which is the read task for the blocks.

16 Claims, 11 Drawing Sheets

(56) References Cited

U.S. PATENT DOCUMENTS

| | | | |
|---|---|---|---|
| 2008/0140691 A1* | 6/2008 | Li | G06F 16/10 |
| 2014/0025911 A1* | 1/2014 | Sims | G11B 20/1803 |
| | | | 711/162 |
| 2017/0286436 A1* | 10/2017 | Neporada | G06F 3/061 |
| 2017/0371563 A1* | 12/2017 | Kawamura | G06F 3/061 |

* cited by examiner

| OBJECT STORAGE DATA MANAGEMENT (OSDM) FUNCTION ID | OBJECT ID BEING READ TASK UNIT FROM TAPE READING | READ REQUEST SOURCE OSDM-ID | READ REQUEST SOURCE OBJECT PART POSITION |
|---|---|---|---|
| OSDM#01 | OBJ#01 | OSDM#02 | 2,4,6 |
| | | OSDM#03 | 7 |
| | | OSDM#04 | 8 |
| OSDM#02 | OBJ#20 | OSDM#01 | 4,5,6 |
| | | OSDM#04 | 2 |
| OSDM#03 | OBJ#13 | OSDM#02 | 3,7 |
| OSDM#04 | NONE | | |
| ... | | | |
| | | | |

FIG. 11

STORAGE CONTROL DEVICE FOR DETERMINING STORAGE DEVICE TO READ COLLECTIVELY BLOCKS OF OBJECT, STORAGE SYSTEM FOR DETERMINING STORAGE DEVICE TO READ COLLECTIVELY BLOCKS OF OBJECT, AND COMPUTER-READABLE RECORDING MEDIUM STORING PROGRAM FOR DETERMINING STORAGE DEVICE TO READ COLLECTIVELY BLOCKS OF OBJECT

CROSS-REFERENCE TO RELATED APPLICATION

This application is based upon and claims the benefit of priority of the prior Japanese Patent Application No. 2019-227435, filed on Dec. 17, 2019, the entire contents of which are incorporated herein by reference.

FIELD

The embodiment discussed herein is related to a storage control device, a storage system, and a computer-readable recording medium.

BACKGROUND

In some distributed storages, hard disk drives (HDDs) or tape devices are used as recording media.

Examples of related art includes Japanese Laid-open Patent Publication Nos. 2005-148854 and 2003-223285.

SUMMARY

According to an aspect of the embodiments, a storage control device, includes: a memory; and a processor coupled to the memory and configured to: dispose a plurality of original blocks to which data on an object basis is divided and assigned and a plurality of copy blocks which are copies of the plurality of original blocks respectively alternately in a plurality of storage devices of a distributed storage system in a distributed manner; determine, upon reception of a read request for an object, as a first storage control device out of the plurality of storage control devices a read task which collectively reads the original blocks and the copy blocks which belong to the object from one of the plurality of storage devices; notify the plurality of storage control devices of the read task; upon reception of the read request as the first storage control device, collectively read the original blocks and the copy blocks; and transfer the data of the blocks which have been read to a second storage control device which is the read task for the blocks.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
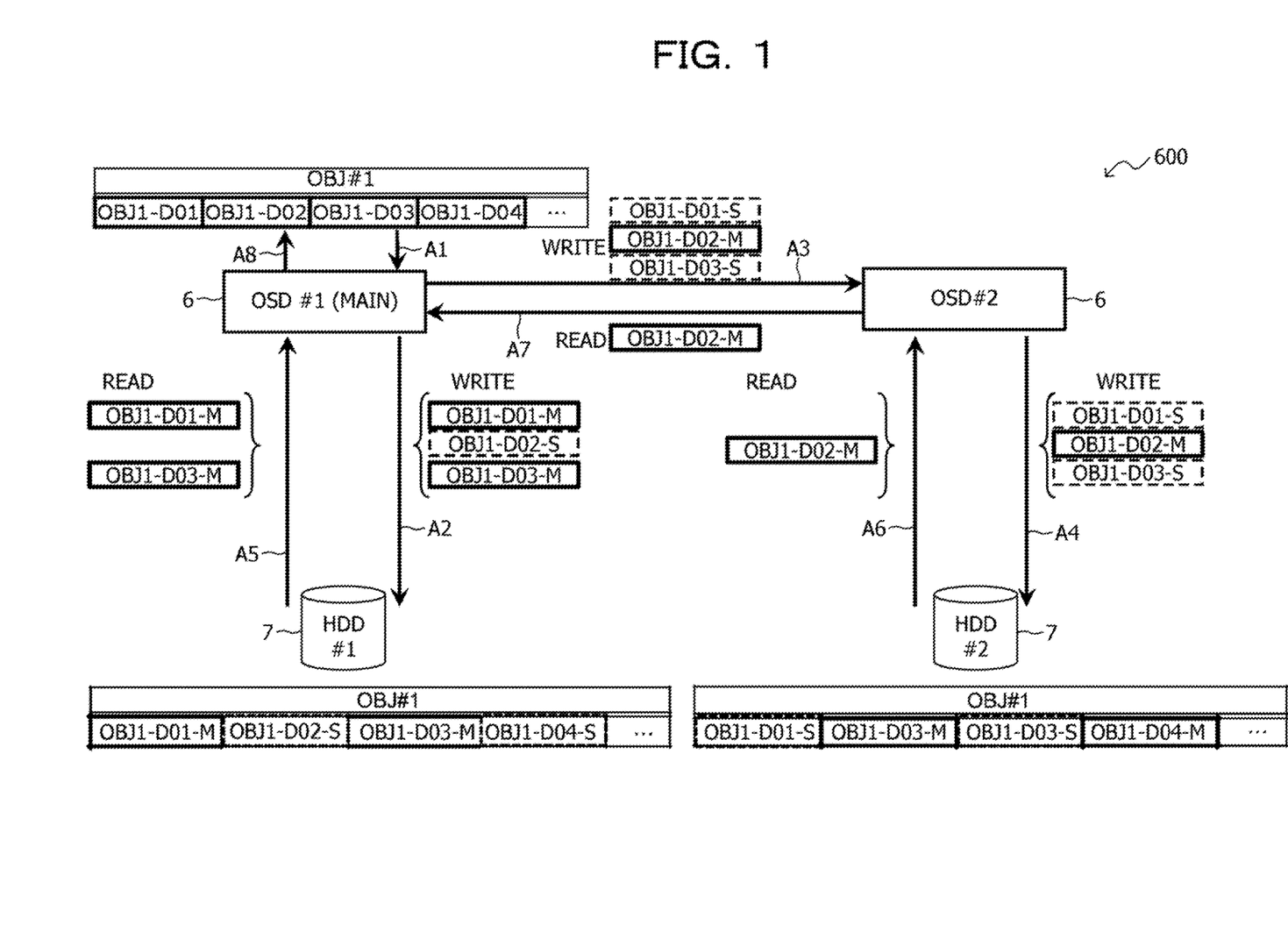
FIG. 1 exemplifies a storage system that includes hard disk drives (HDDs) as a related example.

FIG. 1 exemplifies a storage system 600 that includes a hard disk drive (HDD) 7 as a related example.

The illustrated storage system 600 includes two object storage devices (OSDs) 6 (may also be referred to as "OSDs #1, #2") and two HDDs 7 (may also be referred to as "HDDs #1, #2").

The OSD #1 reads an object from and writes the object to the HDD #1, and the OSD #2 reads the object from and writes the object to the HDD #2. The object may also be referred to as data.

An object write process in the storage system 600 will be described.

The main OSD #1 receives a write request for an object indicated by OB #1 (see reference sign A1). OB #1 includes blocks indicated by OBJ1-D01, OBJ1-D02, OBJ1-D03, OBJ1-D04, . . . . OBJ1 is an ID of the object, and D01, D02, D03, D04, . . . are division numbers of the object.

The OSD #1 writes the blocks indicated by OBJ1-D01-M, OBJ1-D02-S, OBJ1-D03-M to the HDD #1 (see reference sign A2). M denotes main blocks and S denotes sub blocks. The main blocks are original blocks included in the object, and the sub blocks are copy blocks included in the object. In the illustrated example, the main blocks are indicated by solid line boxes, and the sub blocks are indicated by broken line boxes.

The OSD #1 transfers the blocks indicated by OBJ1-D01-S, OBJ1-D02-M, OBJ1-D03-S to the sub OSD #2 (see reference sign A3).

The OSD #2 writes the blocks indicated by OBJ1-D01-S, OBJ1-D02-M, OBJ1-D03-S to the HDD #1 (see reference sign A4).

An object read process in the storage system will be described.

The main OSD #1 writes the blocks indicated by OBJ1-D01-M, OBJ1-D03-M from the HDD #1 (see reference sign A5).

The sub OSD #2 reads the block indicated by OBJ1-D02-M from the HDD #2 (see reference sign A6).

The OSD #2 transfers the block indicated by OBJ1-D02-M to the OSD #1 (see reference sign A7).

The OSD #1 combines OBJ1-D01-M, OBJ1-D02-M, OBJ1-D03-M and outputs the original OBJ #1 (see reference sign A8).

In this way, the main blocks that are divided files and the sub blocks that are copies of the main blocks are managed by servers. For example, the write process is alternately performed in different servers for the main blocks and the sub blocks, and the read process is performed by reading the main blocks in each server.

Figure 2:
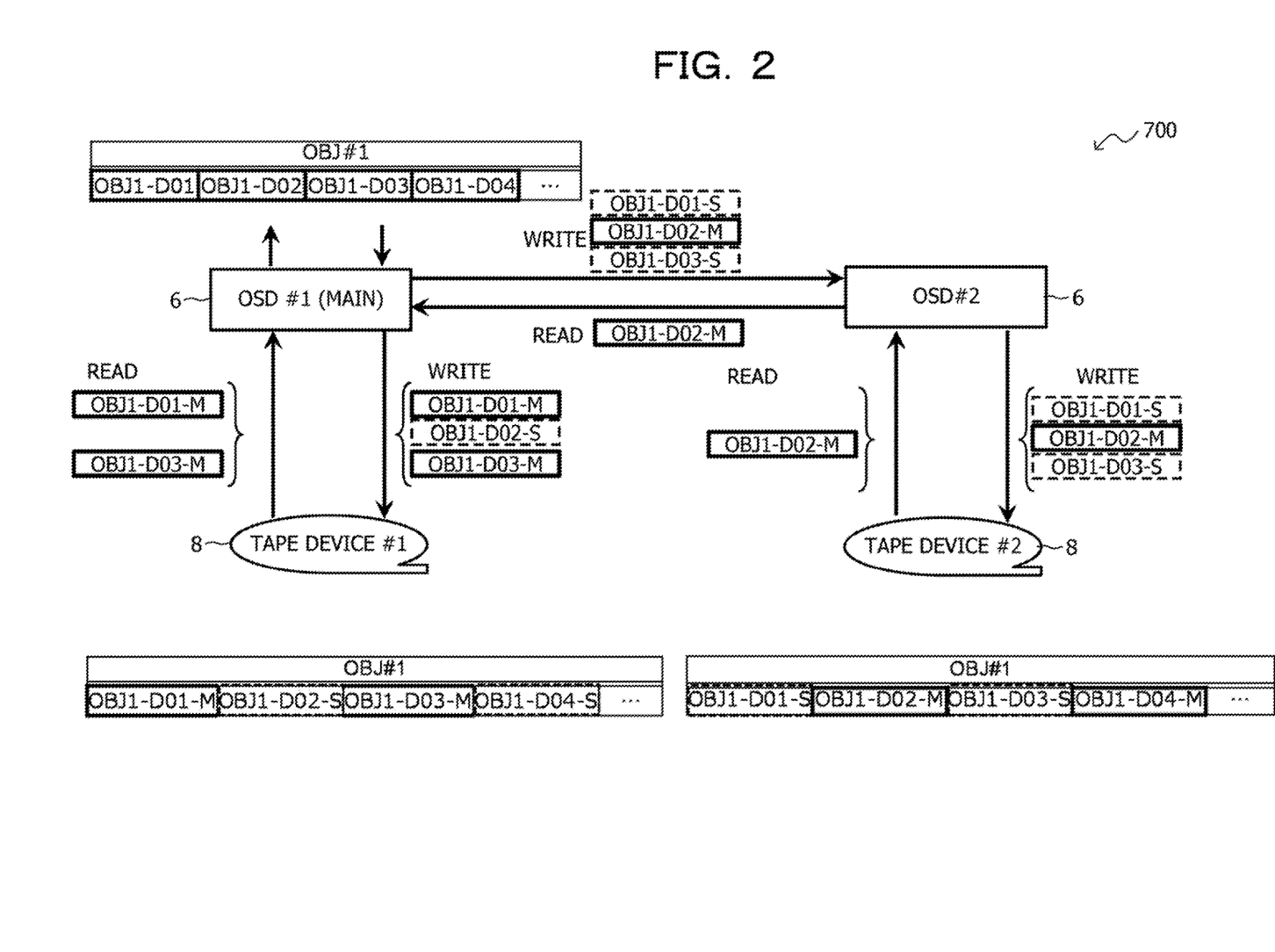
FIG. 2 exemplifies a storage system that includes tape devices as a related example.

FIG. 2 exemplifies a storage system 700 that includes tape devices 8 as a related example.

The illustrated storage system 700 includes two OSDs 6 (may also be referred to as "OSDs #1, #2") and two tape devices 8 (may also be referred to as "tape devices #1, #2").

In the storage system 700 illustrated in FIG. 2, the write process and the read process of the object are performed similarly to the example illustrated in FIG. 1.

However, in the read process from the tape devices 8, the divided small-sized blocks are read from different tape devices 8. This may generate many locations where the tape head is moved to recording positions of the blocks, thereby increasing time taken to obtain the entire object.

Figure 3:
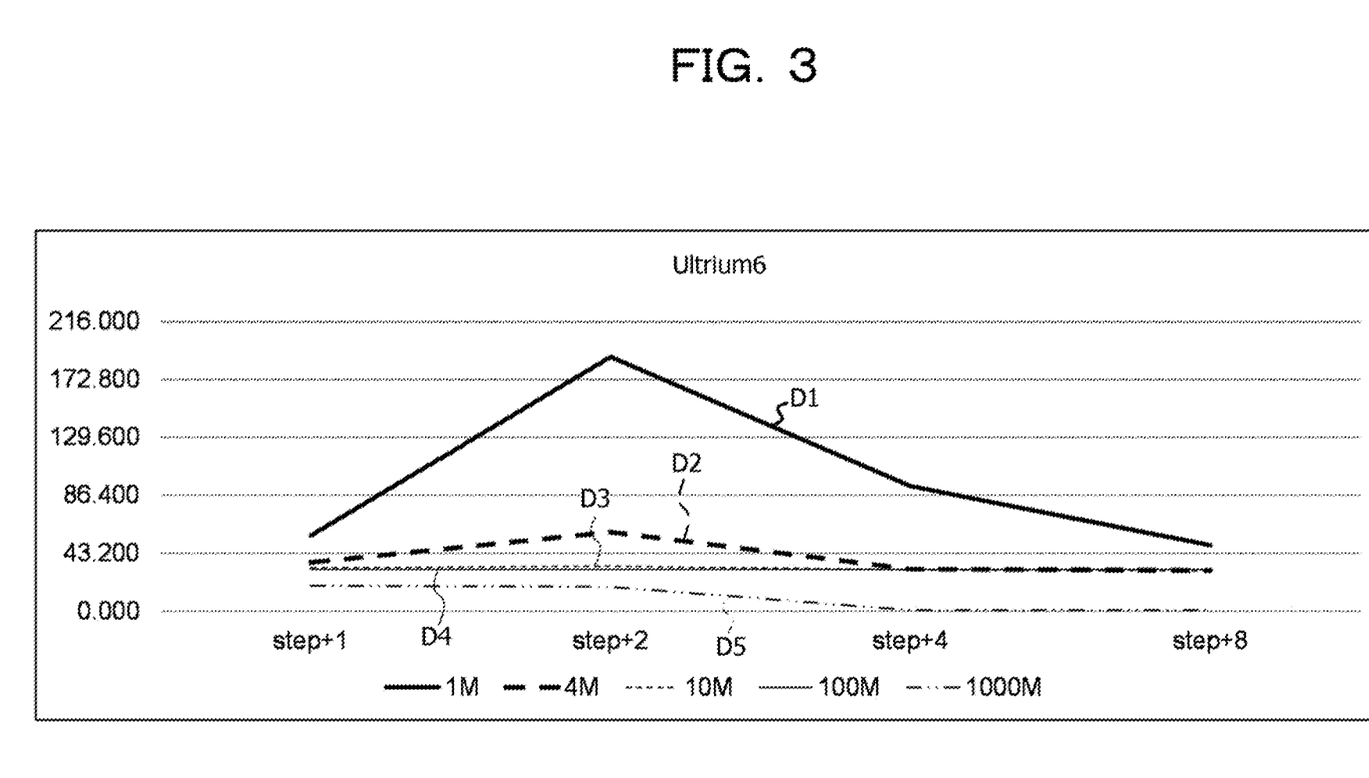
FIG. 3 is a graph illustrating a first example of reading time for an object in the related example.
Figure 4:
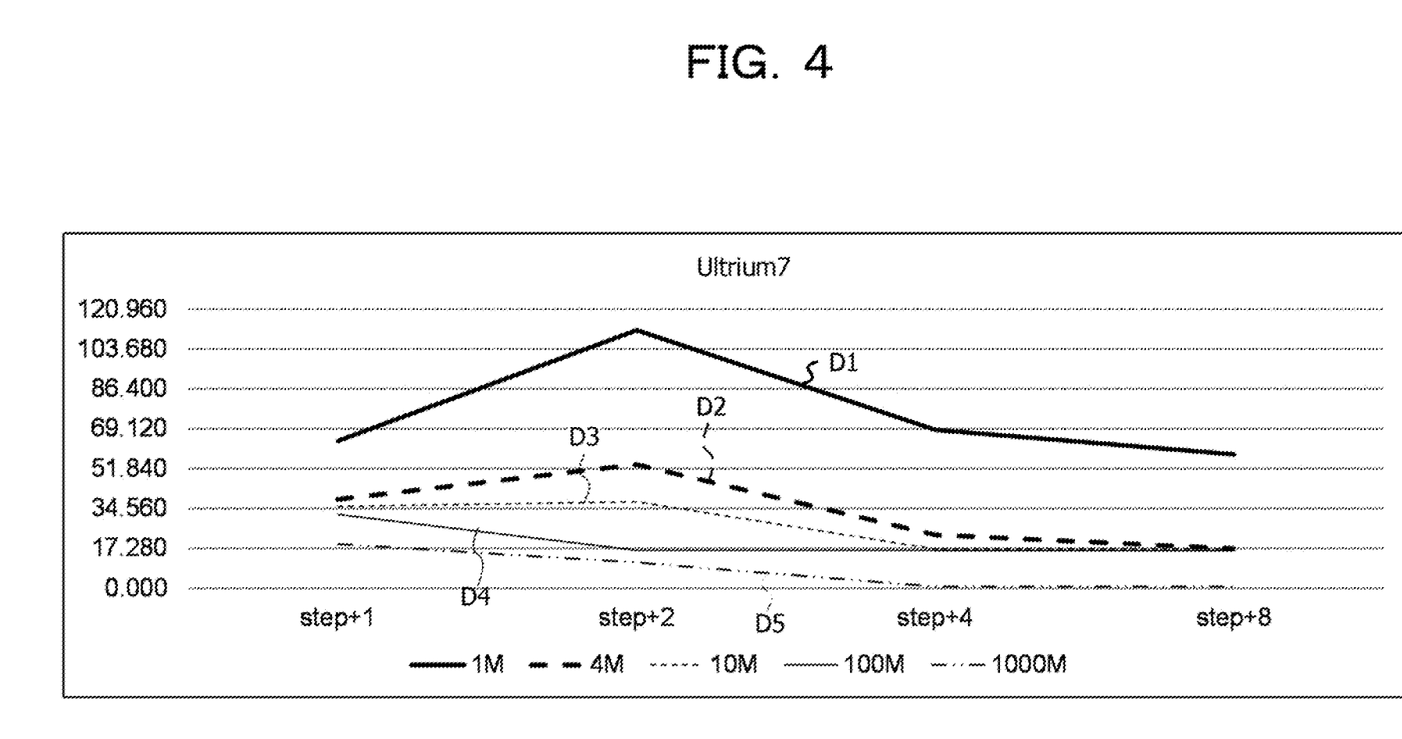
FIG. 4 is a graph illustrating a second example of reading time for an object in the related example.

FIG. 3 is a graph illustrating a first example of reading time for an object in the related example. FIG. 4 is a graph illustrating a second example of reading time for an object in the related example.

The example illustrated in FIG. 3 indicates reading time when an object of 5 GB is continuously or discontinuously read in the case where devices conforming to Ultrium 6, which is the sixth generation Linear Tape-Open (LTO) standard, are used as the tape devices 8. The example illustrated in FIG. 4 indicates reading time when an object of 5 GB is continuously or discontinuously read in the case where devices conforming to Ultrium 7, which is the seventh generation LTO standard, are used as the tape devices 8.

In the examples illustrated in FIGS. 3 and 4, step +1 indicates that the object is continuously read single block by single block, and step +2 indicates that the object is discontinuously read every two blocks. Step +4 indicates that the object is discontinuously read every four blocks, and step +8 indicates that the object is discontinuously read every eight blocks.

In the examples illustrated in FIGS. 3 and 4, reference sign D1 denotes the case where each block is 1 MB, reference sign D2 denotes the case where each block is 4 MB, reference sign D3 denotes the case where each block is 10 MB, reference sign D4 denotes the case where each block is 100 MB, and reference sign D5 denotes the case where each block is 1000 MB.

As illustrated in FIGS. 3 and 4, as the size of the block in the object reduces, the reading time increases. As the discontinuous reading step becomes smaller, the reading time increases.

In one aspect, a reading speed of data in a distributed storage system is improved.

Hereinafter, an embodiment is described with reference to the drawings. The following embodiment is merely exemplary and is in no way intended to exclude various modifications or technical applications that are not explicitly described in the embodiment. For example, the present embodiment may be carried out in various modified forms without departing from the gist of the present embodiment.

Each drawing is not intended to include only elements illustrated in the drawing but may include other functions and the like.

The same reference signs denote the same or similar elements in the drawings, thereby the description thereof is omitted.

[A] Example of Embodiment

[A-1] Example of System Configuration

Figure 5:
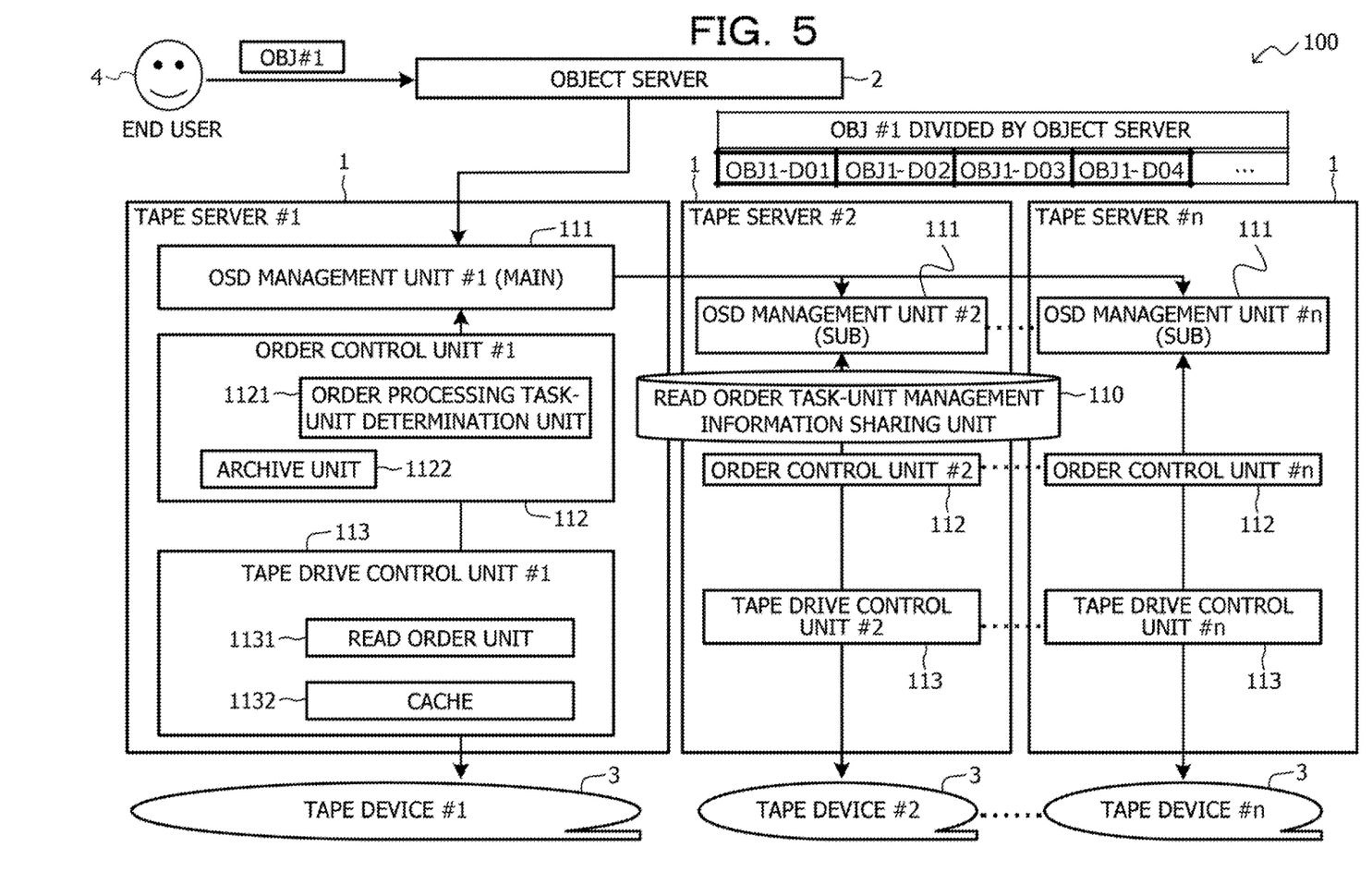
FIG. 5 is a block diagram illustrating a configuration example of a storage system in an example of an embodiment.

FIG. 5 is a block diagram illustrating a configuration example of a storage system 100 in an example of the embodiment.

A storage system 100 includes n (n is an integer of 2 or greater) tape servers 1 (may also be referred to as "tape servers #1 to #n"), an object server 2, and n tape devices 3 (may also be referred to as "tape devices #1 to #n").

The object server 2 may also be referred to as an "object storage server". The object server 2 divides an object in accordance with an input instruction of the object from an end user 4. In the illustrated example, the object server 2 divides OBJ #1 into OBJ1-D01, OBJ1-D02, OBJ1-D03, OBJ1-D04, . . . .

The tape devices 3 store a divided object (may also be referred to as "blocks") in a distributed manner.

Each of the tape servers 1 is an example of a storage control device. The tape servers 1 perform control to store a plurality of blocks obtained by dividing an object to the tape devices 3 in a distributed manner and in a redundant form. The tape servers 1 include OSD management units 111, order control units 112, and tape drive control units 113. The tape servers #1 to #n include the respective OSD management units #1 to #n, the respective order control units #1 to #n, and the respective tape drive control units #1 to #n. The tape servers #1 to #n include a read order task-unit management information sharing unit 110 as a common function.

The OSD management units 111 determine the tape devices 3 as storage destinations of the divided object. The tape server #1 includes the main OSD management unit #1. The tape servers #2 to #n include the sub OSD management units #2 to #n, respectively.

For example, the OSD management units 111 are examples of a write control unit and instruct the plurality of tape servers 1 to write original blocks and copy blocks to the plurality of tape devices 3 in a distributed manner. The OSD management units 111 are also examples of an object management unit, combine the original blocks read by the tape drive control units 113 with the copy blocks transferred from a second tape server 1, and output the combined original and copy blocks.

The order control units 112 may also be referred to as an archive agents (A2s) and include order processing task-unit determination units 1121 and archive units 1122. The tape servers #1 to #n include the respective order processing task-unit determination units #1 to #n.

The order processing task-unit determination units 1121 determine from which of the order control units 112 an archive including the divided object issued by the OSD management units 111 is read. The order processing task-unit determination units 1121 assign unprocessed read orders based on load balances among, for example, the order control units 112, the tape drive control units 113, and the tape devices 3 and positional information of the data being processed on the tape devices 3.

The archive units 1122 archive the divided object including main and sub objects as the original object. When the size of an object to be archived by the archive unit 1122 is small, the archive unit 1122 may archive the object together with another object. The archive unit 1122 manages how the divided object is archived.

For example, each of the order control units 112 is an example of a read process task-unit determination unit.

Upon reception of a read request for the object, the order control units 112 determine as a first tape server 1 a read process task unit that collectively reads the original blocks and the copy blocks belonging to the object from one of the plurality of tape devices 3. The order control units 112 notify the plurality of tape servers 1 of the read task unit.

In this way, the order control units 112 of the tape servers 1 communicate with each other so as to determine a collective read task unit in accordance with mutual processing states. The order control unit 112 of the second tape server 1 may utilize the data of the order control unit 112 of the first tape server 1 to which the blocks of the object have been read in advance by collectively reading.

The order control units 112 may determine the first tape server 1 not performing processing as the collective read task unit. The order control units 112 may determine as the collective read task unit one of the tape servers 1 for which the recording position of the plurality of blocks is closest to the current reading direction of a tape head in the tape device 3.

The tape drive control units 113 may also be referred to as "advanced file system over LTFSs (AFSOLs)" and include read order units 1131 and caches 1132. The "LTFSs" is the abbreviation of linear tape file systems. The tape servers #1 to #n include the respective tape drive control units #1 to #n.

The read order unit 1131 performs control such as rearranging of read orders issued by the order control units 112 so as to uniform reading directions in a uniform direction or continuous reading without skipping small data by considering recording positions on the tape.

The caches 1132 are each a storage device such as a hard disk drive (HDD) or a solid-state drive (SSD) that is able to be accessed at high speed and is a memory in which the data read from the tape device 3 is primarily recorded. In response to a read request from the order control unit 112 of another tape server 1, the data is read from the storage device without accessing and reading the data from the tape device 3 for each request.

For example, the tape drive control units 113 each are an example of a read processing unit. When receiving a read request as the first tape server 1, the tape drive control unit 113 collectively reads the original blocks and the copy blocks and transfers the data of the read blocks to the second tape server 1 being the read task unit for those blocks.

With the read order task-unit management information sharing unit 110, information about which block of which object is currently processed by which order control unit 112 is shared between the order control units 112. With this mechanism, whether to transfer the read request of the target block of the object to be read may be determined.

Figure 6:
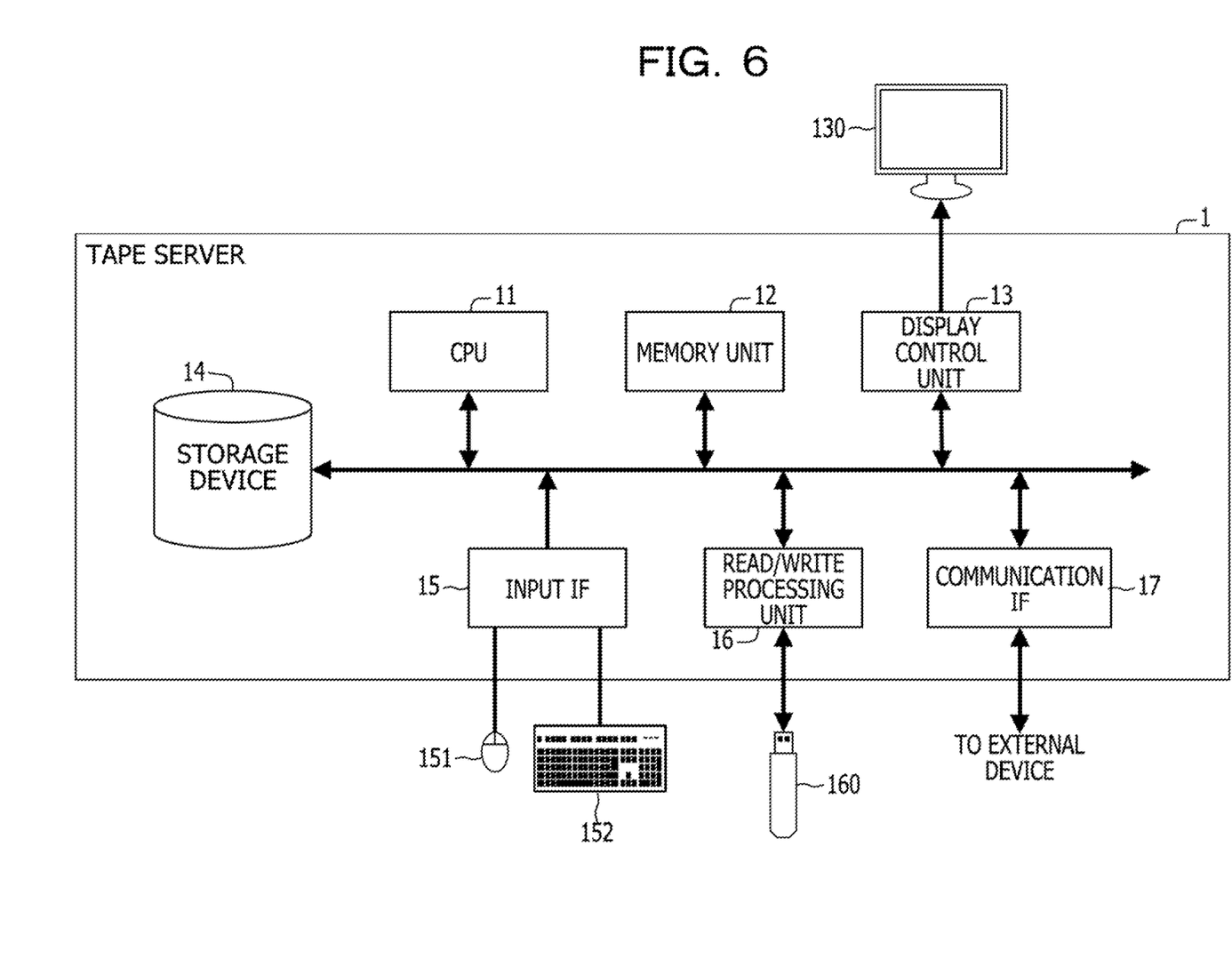
FIG. 6 is a block diagram illustrating a hardware configuration example of a tape server illustrated in FIG. 5.

FIG. 6 is a block diagram illustrating a hardware configuration example of the tape server 1 illustrated in FIG. 5.

As illustrated in FIG. 6, the tape server 1 includes a central processing unit (CPU) 11, a memory unit 12, a display control unit 13, a storage device 14, an input interface (IF) 15, a read/write processing unit 16, and a communication IF 17. Similarly to the tape server 1, the object server 2 may have the hardware configuration illustrated in FIG. 6.

The memory unit 12 is an example of a storage unit and includes, for example, a read-only memory (ROM) and a random-access memory (RAM). Programs such as a Basic Input/Output System (BIOS) and the like may be written to the ROM of the memory unit 12. The software programs in the memory unit 12 may be appropriately loaded to and executed by the CPU 11. The RAM of the memory unit 12 may be utilized as a primary recording memory or a working memory.

The display control unit 13 is coupled to a display device 130 and controls the display device 130. The display device 130 is a liquid crystal display, an organic light-emitting diode (OLED) display, a cathode ray tube (CRT), an electronic paper display, or the like and displays various types of information for, for example, an operator. The display device 130 may be combined with an input device and may be, for example, a touch panel.

The storage device 14 is, for example, a device to which data is written, from which the data is read, and in which the data is stored. As the storage device 14, for example, an HDD, an SSD, or a storage class memory (SCM) may be used. The storage device 14 may store read order task unit management information, which will be described later with reference to FIG. 10.

The input IF 15 may be coupled to input devices such as a mouse 151 and a keyboard 152 so as to control the input devices such as the mouse 151 and the keyboard 152. The mouse 151 and the keyboard 152 are examples of the input device. The operator performs various input operations via these input devices.

A recording medium 160 is attachable to the read/write processing unit 16. When the recording medium 160 is attached to the read/write processing unit 16, the read/write processing unit 16 is able to read information recorded on the recording medium 160. According to the present example, the recording medium 160 is portable. For example, the recording medium 160 is a flexible disk, an optical disk, a magnetic disk, a magneto-optical disk, a semiconductor memory, or the like.

The communication IF 17 is an interface that enables communication with an external device.

The CPU 11 is a processing device that performs various types of control and various operations. The CPU 11 realizes various functions by executing an operating system (OS) and the programs stored in the memory unit 12.

A device for controlling operations of the entirety of the tape server 1 is not limited to the CPU 11 and may be, for example, any one of an MPU, a DSP, an ASIC, a PLD, and an FPGA. The device for controlling the operations of the entirety of the tape server 1 may be a combination of two or more of the CPU, the MPU, the DSP, the ASIC, the PLD, and the FPGA. The MPU is an abbreviation of microprocessor unit, the DSP is an abbreviation of digital signal processor, and the ASIC is an abbreviation of application-specific integrated circuit. The PLD is an abbreviation of programmable logic device, and the FPGA is an abbreviation of field-programmable gate array.

Figure 7:
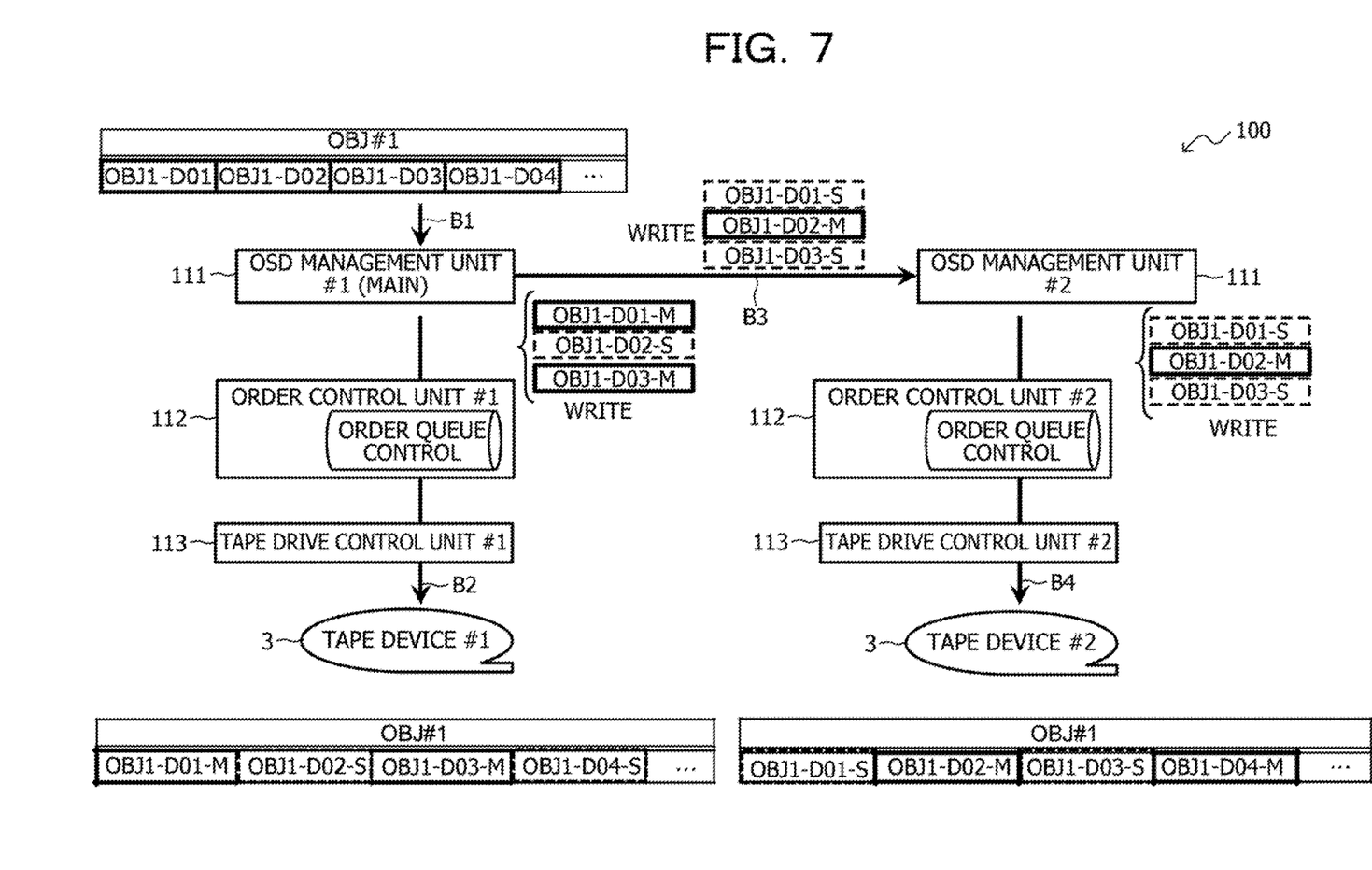
FIG. 7 is a block diagram illustrating a write process of the object in the storage system illustrated in FIG. 5.

FIG. 7 is a block diagram illustrating a write process of the object in the storage system 100 illustrated in FIG. 5.

The main OSD management unit #1 receives a write request for the object indicated by OB #1 (see reference sign B1). OBJ #1 includes blocks indicated by OBJ1-D01, OBJ1-D02, OBJ1-D03, OBJ1-D04, . . . OBJ1 is an ID of the object, and D01, D02, D03, D04, . . . are division numbers of the object.

The OSD management unit #1 determines the OSD management unit #1 and the OSD management unit #2 as write task units for OBJ #1. The OSD management unit #1 writes the blocks indicated by OBJ1-D01-M, OBJ1-D02-S, OBJ1-D3-M to the tape device #1 via the order control unit #1 and the tape drive control unit #1 (see reference sign B2). M denotes main blocks and S denotes sub blocks. The main blocks are original blocks included in the object, and the sub blocks are copy blocks included in the object. In the illustrated example, the main blocks are indicated by solid line boxes, and the sub blocks are indicated by broken line boxes.

The OSD management unit #1 transfers the blocks indicated by OBJ1-D01-S, OBJ1-D02-M, OBJ1-D03-S to the sub OSD management unit #2 (see reference sign B3).

The OSD management unit #2 writes the blocks indicated by OBJ1-D01-S, OBJ1-D02-M, OBJ1-D03-S to the tape device #2 via the order control unit #2 and the tape drive control unit #2 (see reference sign B4).

In this way, the main OSD management unit #1 performs control to alternate the write task unit for the main blocks and the write task unit for the sub blocks between the OSD management unit #1 and the OSD management unit #2. For example, the destination of a write request for the main blocks alternates between the OSD management unit #1 and the OSD management unit #2 one block after another. The destination of a write request for the sub blocks alternates between the OSD management unit #2 and the OSD management unit #1 one block after another.

Figure 8:
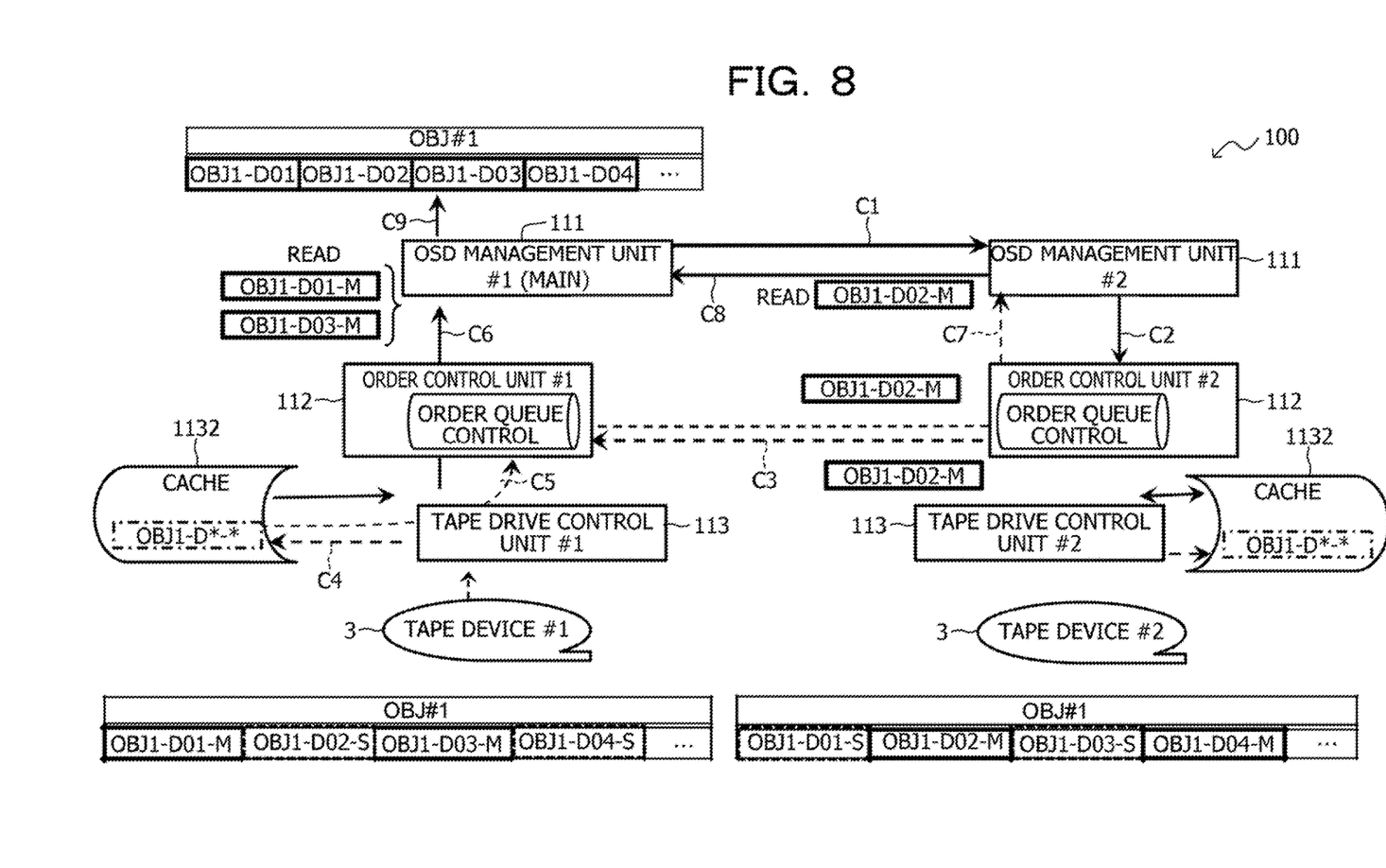
FIG. 8 is a block diagram illustrating a read process of the object in the storage system illustrated in FIG. 5.

FIG. 8 is a block diagram illustrating a read process of the object in the storage system 100 illustrated in FIG. 5.

The main OSD management unit #1 receives a read request for OBJ1 from the object server 2. The main OSD management unit #1 extracts the OSD management unit #1 and the sub OSD management unit #2 to manage data of OBJ1 from among the plurality of OSD management units 111. The OSD management unit #1 transfers the read request for each main block of OBJ1 to the order control unit #1 and the OSD management unit #2.

For example, in the case of reading OBJ1-D01-M, the OSD management unit #1 transfers the read request to the order control unit #1 being a task unit for managing OBJ1-D01-M. In the case of reading OBJ1-D02-M, the OSD management unit #1 transfers the read request to the OSD management unit #2 being a task unit for managing OBJ1-D02-M (see reference sign C1).

The OSD management unit #2 instructs the order control unit #2 to read OBJ1-D02-M (see reference sign C2).

The order control unit #2 transfers the read request to the order control unit #1 being the collective read task unit without reading entire OBJ #2 from the tape device (see reference sign C3). How to determine the collective read task unit will be described later.

The tape drive control unit #1 additionally reads entire OBJ #1 when reading OBJ1-D01-M from the tape device and stores the read OBJ #1 in the cache 1132 (see reference sign C4).

The order control unit #1 performs order queue control on entire OBJ #1 read from the cache 1132 (see reference sign C5).

The order control unit #1 returns OBJ1-D01-M, OBJ1-D03-M of entire OBJ #1 having undergone the order queue control to the OSD management unit #1 as read results (see reference sign C6).

The order control unit #1 returns a read result in which OBJ1-D02-S are set to OBJ1-D02-M out of entire OBJ #1 having undergone the order queue control to the OSD management unit #2 via the order control unit #2 (see reference sign C7).

The OSD management unit #2 returns OBJ1-D02-M as a read result to the OSD management unit #1 (see reference sign C8). These processes are repeated until all the main blocks of OBJ #1 have been read.

The OSD management unit #1 combines OBJ1-D01-M, OBJ1-D02-M, OBJ1-D03-M . . . to restore the series of pieces of data and outputs the original OBJ #1 (see reference sign C9).

As described above, in the object read process, all the blocks of the object are obtained from the same tape device 3. For example, partial object read requests to the plurality of tape devices 3 are collected to a single tape device 3 to collectively read. With two tape devices 3 as illustrated in FIG. 8, in a two-replica two-node configuration distributed storage that stores one main block and one sub block, compared to the related example described with reference to FIG. 2, twice or higher reading performance may be realized. Since the tape device 3 that is not performing the process may collectively read another object, the entirety of the storage system 100 may realize four times high processing performance.

Figure 9:
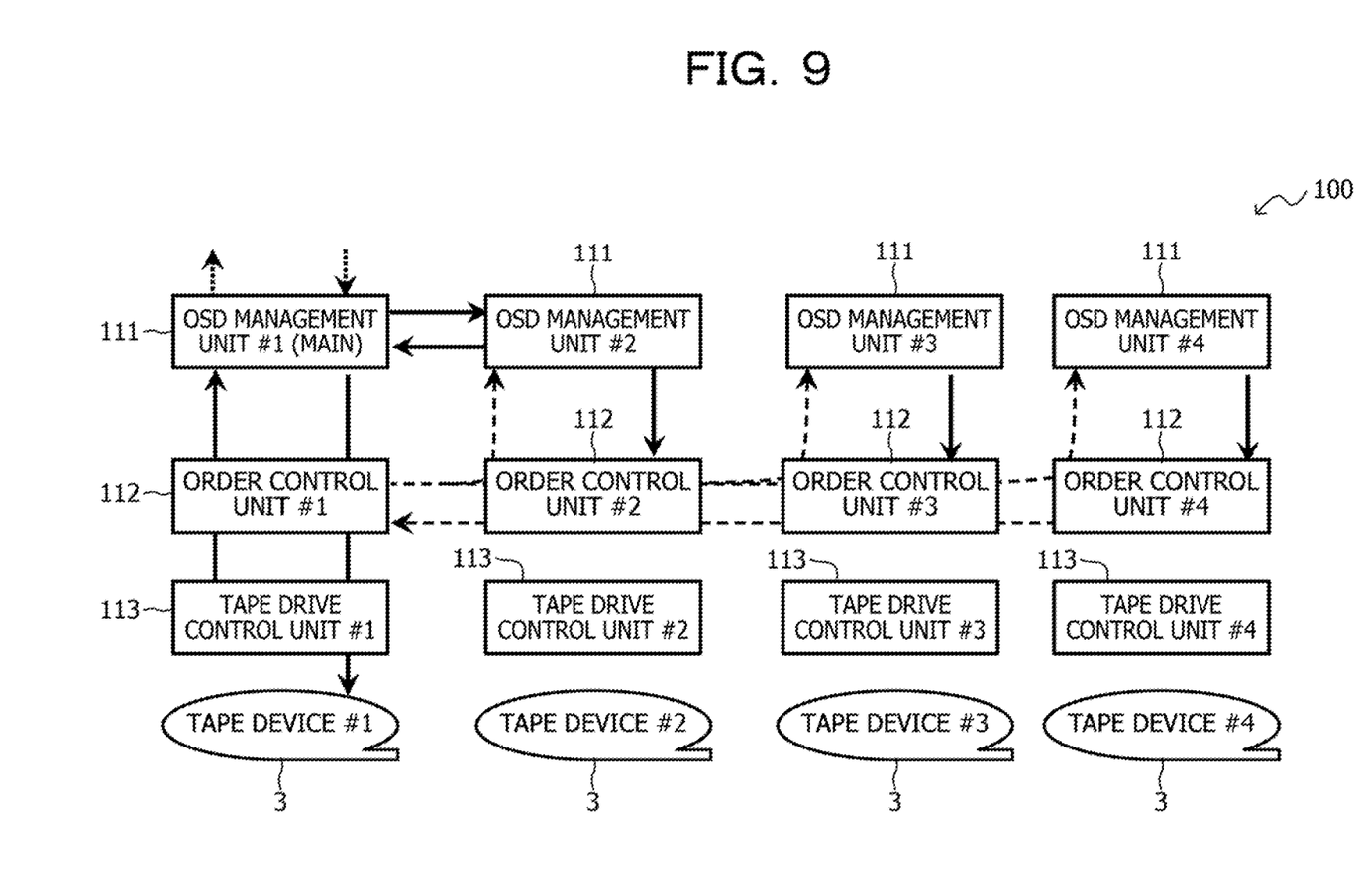
FIG. 9 is a block diagram for explaining an example of an increase in the number of replicas in the storage system illustrated in FIG. 5.

FIG. 9 is a block diagram illustrating an example in which the number of replicas is increased in the storage system 100 illustrated in FIG. 5.

When the number of replicas is increased in the storage system 100, object read processes may be further increased.

In the example illustrated in FIG. 9, the storage system 100 includes the OSD management units #1 to #4, the order control units #1 to #4, the tape drive control units #1 to #4, and the tape devices #1 to #4.

With four tape devices 3 as illustrated in FIG. 9, in the case of a four-replica four-node configuration in which one main block and three sub blocks are stored, only one tape device 3 is driven. This reduces the location frequency of the tape devices 3 to one fourth logically, and the reading performance is improved four times. Since the OSD management units 111 during execution of a read request may perform parallel processing of reading another object, the performance is improved four times.

Since the tape devices 3 not performing the process may collectively read another object, logically, the entirety of the storage system 100 may improve processing performances and redundancy performance 16 times.

Figure 10:
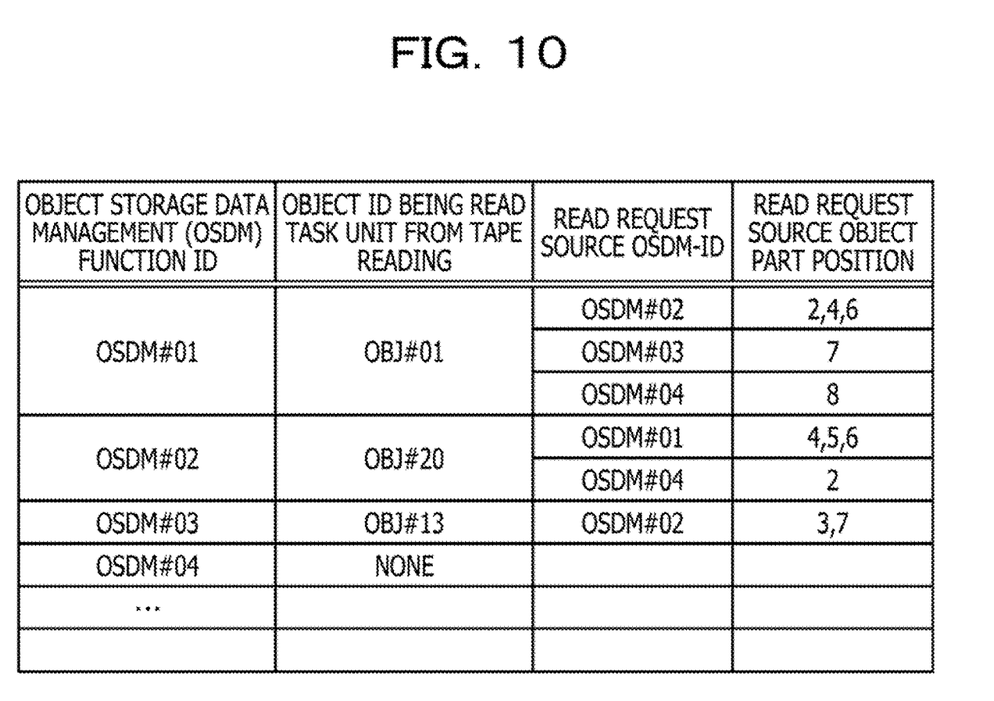
FIG. 10 is a table exemplifying read order task unit management information in the storage system illustrated in FIG. 5.

FIG. 10 is a table exemplifying the read order task unit management information in the storage system 100 illustrated in FIG. 5.

The read order task unit management information is shared between the tape servers 1 by using the read order task-unit management information sharing unit 110 for management of in which of the archive destinations the divided object is archived. The read order task unit management information includes an object storage data management (OSDM) function ID, an object ID, a read request source OSDM-ID, and a read request source object part position.

The OSDM function ID is an identifier for identifying the OSD management unit 111 that has received the object read request. The object ID is an ID for identifying an object to be read. The read request source OSDM-ID is an identifier for identifying the OSD management unit 111 that has issued the object read request. The read request source object part position is an identifier for identifying a divided block in the object.

[A-2] Operation Example

Figure 11:
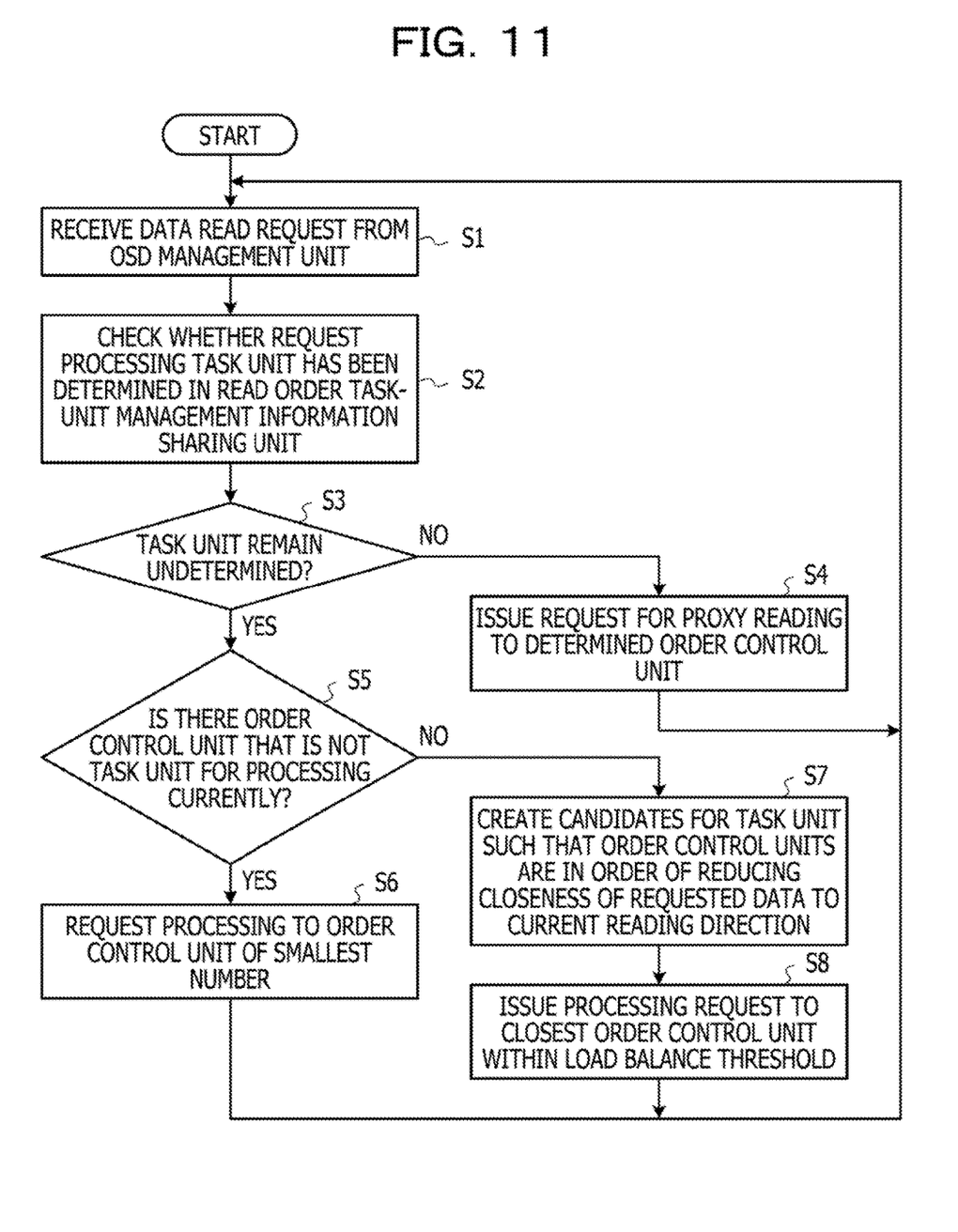
FIG. 11 is a flowchart illustrating an assignment process of a processing task unit in tape servers illustrated in FIG. 5.

An assignment process of a processing task unit in the tape servers 1 illustrated in FIG. 5 will be described with reference to a flowchart (steps S1 to S8) illustrated in FIG. 11.

The order control unit 112 receives a data read request from the OSD management unit 111 (step S1).

The order control unit 112 checks whether the task unit for the data read request has been determined in the read order task-unit management information sharing unit 110 (step S2).

The order control unit 112 determines whether the task unit for the data read request remains undetermined (step S3).

When the task unit has been determined (see "No" route in step S3), a request for proxy reading is issued to the order control unit 112 of the tape server 1 determined as the task unit (step S4). Then, the process returns to step S1.

In contrast, when the task unit remains undetermined (see "Yes" route in step S3), the order control unit 112 determines whether there is an order control unit 112 of a tape server 1 that is not the task unit for processing currently (step S5).

When there is an order control unit 112 that is not the task unit for processing currently (see "Yes" route in step S5), the order control unit 112 issues a processing request to the order control unit 112 of the tape server 1 to which a smallest identification number is assigned (step S6). Then, the process returns to step S1.

In contrast, when there is no order control unit 112 that is not the task unit for processing currently ("No" route in step S5), the process proceeds to step S7. The order control unit 112 creates candidates for the task unit such that the order control units 112 of the tape servers 1 are in order of reducing closeness of the read request data to the current reading direction of the tape head (step S7).

The order control unit 112 issues the processing request to the order control unit 112 of the closest tape server 1 within load balance thresholds (step S8). Then, the process returns to step S1.

[A-3] Effects

With the storage control device, the storage system, and the control program according to the example of the embodiment, for example, operation and effect described below may be obtained.

Upon reception of the read request for the object, the order control units 112 determine as the first tape server 1 the read process task unit that collectively reads the original blocks and the copy blocks belonging to the object from one of the plurality of tape devices 3. The order control units 112 notify the plurality of tape servers 1 of the read task unit. When receiving the read request as the first tape server 1, the tape drive control unit 113 collectively reads the original blocks and the copy blocks and transfers the data of the read blocks to the second tape server 1 being a read task unit for those blocks.

Thus, the data reading speed in the distributed storage system may be improved. For example, the reading performance may be improved while maintaining the redundancy of the storage system 100. In the case of the storage system 100 of an n-replica configuration, the reading performance may be increased by n times compared to the related example illustrated in FIGS. 1 to 4.

The OSD management units 111 instruct the plurality of tape servers 1 to write the original blocks and the copy blocks to the plurality of tape devices 3 in a distributed manner.

Thus, sequential writing of the objects to the tape devices 3 may be realized.

The OSD management units 111 combine the original blocks read by the tape drive control units 113 with the copy blocks transferred from the second tape server 1 and output the combined original and copy blocks.

Thus, the end user 4 may receive the output of the correct object.

The order control units 112 determine the first tape server 1 not performing processing as the collective read task unit.

In this way, the load on the tape servers 1 and the tape devices 3 may be distributed. When there are a plurality of tape servers 1 that are not performing processing, different read requests may be assigned to different tape servers 1 to improve multiplicity. This may further improve the reading performance.

The order control units 112 determine as the collective read task unit one of the tape servers 1 for which the recording position of the plurality of blocks is closest to the current reading direction of the tape head in the tape device 3.

Thus, the reading speed for the blocks from the tape server 1 may be improved.

[B] Others

The techniques disclosed herein are not limited to the above-described embodiment and may be modified in various manners without departing from the gist of the present embodiment. The configurations and processes described according to the present embodiment may be selected as desired or may be combined as appropriate.

Although the storage system 100 includes the tape devices 3 as recording media that store objects according to the example of the embodiment described above, this is not limiting. The storage system 100 may include various sequential recording media. The various sequential recording media may be, for example, optical discs such as compact disks (CDs), digital video disks (DVDs), and Blu-ray disks. The CDs may be CD-ROMs, CD-Rs, CD-RWs, and the like, and the DVDs may be DVD-ROMs, DVD-RAMs, DVD-Rs, DVD+Rs, DVD-RWs, DVD+RWs, HD DVDs, and the like.

Since the objects are stored in the sequential recording media as described above, for example, the effects of the above-described example of the embodiment may be expected.

The storage system 100 may include a magnetic disk such as an HDD as a recording medium for storing objects. Even when the storage system 100 includes a magnetic disk instead of the tape device 3, the storage system 100 as an OSD may perform processing other than reading of an object, and accordingly, the load on the entire storage system 100 may be reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage control device, comprising:
a memory; and
a processor coupled to the memory and configured to:
determine, upon reception of a read request for an object, the storage control device as a first storage control device to collectively read a plurality of blocks of the object out of a plurality of storage control devices in a storage system in which the plurality of blocks which are obtained by dividing the object and include a plurality of original blocks and a plurality of copy blocks corresponding to copies of the plurality of original blocks are arranged in a distributed manner in a plurality of storage devices provided for the respective plurality of storage control devices;
notify the plurality of storage control devices of a determination of the storage control device as first storage control device;
collectively and continuously read, upon reception of a write for the object request as the first storage control device, all of the plurality of blocks of the object from one of the plurality of storage devices;
determine, as a second storage control device to store the plurality of blocks of the object, the storage control device and another storage control device of the plurality of storage control devices;
store a part of the plurality of blocks which includes at least one original block and at least one copy block in a storage device for the first storage control device;
transfer remaining blocks which are other than the part of the plurality of blocks and include at least another original block and at least another copy block to the another storage control device;
transfer, upon reception of the read request for the object, a read request for the at least another original block included in the remaining blocks to the another storage control device, by the first storage control device;
transfer, by the another storage control device, the read request for the at least another original block included in the remaining blocks to the first control device without reading the remaining blocks form another storage device for the another storage control device;
read, by the first storage control device, the part of the plurality of blocks and a copy block corresponding to the at least another original block included in the remaining blocks from the storage device for the first storage control device;
transfer the copy block corresponding to the at least another original block to the another storage control device; and
transfer, by the another storage control device, the copy block corresponding to the at least another original block as an original block to the first storage control device.

2. The storage control device according to claim 1, wherein the processor is configured to instruct the plurality of storage control devices to write the original blocks and the copy blocks to the plurality of storage devices in a distributed manner.

3. The storage control device according to claim 1, wherein the processor is configured to combine the part of the plurality of blocks which have been read with the remaining blocks transferred from the another storage control device and output blocks combined with each other.

4. The storage control device according to claim 1, wherein the storage control device is determined as the first storage control device when not performing processing.

5. The storage control device according to claim 1, wherein the storage devices are sequential recording medium devices, and the storage control device is determined as the first storage control device when a recording position of the plurality of blocks is closest to a current reading direction of a head in a sequential recording medium device corresponding to the storage control device.

6. A storage system comprising:
a plurality of storage devices; and
a plurality of storage control devices,
a storage control device of the plurality of storage control devices is configured to:
determine, upon reception of a read request for an object, the storage control device as a first storage control device to collectively read a plurality of blocks of the object out of the plurality of storage control devices in a storage system in which the plurality of blocks which are obtained by dividing the object and include a plurality of original blocks and a plurality of copy blocks corresponding to copies of the plurality of original blocks are arranged in a distributed manner in the plurality of storage devices provided for the respective plurality of storage control devices;
notify the plurality of storage control devices of a determination of the storage control device as first storage control device;
collectively and continuously read, upon reception of a write for the object request as the first storage control device, all of the plurality of blocks of the object from one of the plurality of storage devices;
determine, as a second storage control device to store the plurality of blocks of the object, the storage control device and another storage control device of the plurality of storage control devices;
store a part of the plurality of blocks which includes at least one original block and at least one copy block in a storage device for the first storage control device;
transfer remaining blocks which are other than the part of the plurality of blocks and include at least another original block and at least another copy block to the another storage control device;
transfer, upon reception of the read request for the object, a read request for the at least another original block included in the remaining blocks to the another storage control device, by the first storage control device;
transfer, by the another storage control device, the read request for the at least another original block included in the remaining blocks to the first control device without reading the remaining blocks from another storage device for the another storage control device;
read, by the first storage control device, the part of the plurality of blocks and a copy block corresponding to the at least another original block included in the remaining blocks from the storage device for the first storage control device;
transfer the copy block corresponding to the at least another original block to the another storage control device; and
transfer, by the another storage control device, the copy block corresponding to the at least another original block as an original block to the first storage control device.

7. The storage system according to claim 6, wherein the another control device transmit the data of the remaining blocks received from the storage control device to the storage control device, and wherein the storage control device restores the object from the data of the remaining blocks and the data of the part of the plurality of blocks and outputs data of the restored object.

8. The storage system according to claim 6, wherein the first storage control device is configured to instruct the plurality of storage control devices to write the original blocks and the copy blocks to the plurality of storage devices in a distributed manner.

9. The storage system according to claim 6, wherein the first storage control device is configured to combine the part of the plurality of blocks that have been read with the remaining blocks transferred from the another storage control devices and output the blocks combined with each other.

10. The storage system according to claim 6, wherein the storage control device is determined as the first storage control device when not performing processing.

11. The storage system according to claim 6, wherein the storage devices are sequential recording medium devices, and wherein the storage control device is determined as the first storage control device when a recording position of the plurality of blocks is closest to a current reading direction of a head in a sequential recording medium device corresponding to the storage control device.

12. A non-transitory computer-readable recording medium having stored therein a program for causing a computer to execute a process for control, the process including:
  determining, upon reception of a read request for an object, a storage control device as a first storage control device to collectively read a plurality of blocks of the object out of a plurality of storage control devices in a storage system in which the plurality of blocks which are obtained by dividing the object and include a plurality of original blocks and a plurality of copy blocks corresponding to copies of the plurality of original blocks are arranged in a distributed manner in a plurality of storage devices provided for the respective plurality of storage control devices;
  notifying the plurality of storage control devices of a determination of the storage control device as first storage control device;
  collectively and continuously reading, upon reception of a write for the object request as the first storage control device, all of the plurality of blocks of the object from one of the plurality of storage devices;
  determining, as a second storage control device to store the plurality of blocks of the object, the storage control device and another storage control device of the plurality of storage control devices;
  storing a part of the plurality of blocks which includes at least one original block and at least one copy block in a storage device for the first storage control device;
  transferring remaining blocks which are other than the part of the plurality of blocks and include at least another original block and at least another copy block to the another storage control device;
  transferring, upon reception of the read request for the object, a read request for the at least another original block included in the remaining blocks to the another storage control device, by the first storage control device;
  transferring, by the another storage control device, the read request for the at least another original block included in the remaining blocks to the first control device without reading the remaining blocks from another storage device for the another storage control device;
  reading, by the first storage control device, the part of the plurality of blocks and a copy block corresponding to the at least another original block included in the remaining blocks from the storage device for the first storage control device;
  transferring the copy block corresponding to the at least another original block to the another storage control device; and
  transferring, by the another storage control device, the copy block corresponding to the at least another original block as an original block to the first storage control device.

13. The non-transitory computer-readable recording medium according to claim 12, wherein the process further includes instructing the plurality of storage control devices to write the original blocks and the copy blocks to the plurality of storage devices in a distributed manner.

14. The non-transitory computer-readable recording medium according to claim 12, wherein the process further includes combining the part of the plurality of blocks that have been read with the remaining blocks transferred from the another storage control device and outputting the blocks combined with each other.

15. The non-transitory computer-readable recording medium according to claim 12, wherein the storage control device is determined as the first storage control device when not performing processing.

16. The non-transitory computer-readable recording medium according to claim 12, wherein the storage devices are sequential recording medium devices, and wherein the storage control device is determined as the first storage control device when a recording position of the plurality of blocks is closest to a current reading direction of a head in a sequential recording medium device corresponding to the storage control device.

* * * * *